United States Patent Office 3,124,465
Patented Mar. 10, 1964

3,124,465
PRODUCTION OF CONDIMENTAL, LIQUID-SAUCE SOY
Hiroshi Watanabe, Choshi-Shi, Japan, assignor to Takara Shoyu Kabushiki Kaisha, Tokyo, Japan, a joint-stock company
No Drawing. Filed Apr. 5, 1961, Ser. No. 100,799
Claims priority, application Japan Apr. 28, 1960
2 Claims. (Cl. 99—145)

This invention relates to condimental sauces of the type produced through enzyme action and ripening, and more particularly it relates to the production of a new and improved condimental, liquid-sauce soy of excellent quality.

For a clear understanding of the invention, certain terms which, while they are commonly used in the art in Japan, may be relatively unfamiliar elsewhere, are hereby introduced. The term "koji" is used here to denote steamed rice grain on which mold for saccharification by the action of enzymes (Aspergillus oryzae) has been grown. The term "soy" is used here to denote a condimental sauce derived through the fermentation of soybeans, as defined in most English dictionaries, and referred to as "shoyu" in Japan. The term "mirin" refers to a clear, sweet wine produced through the saccharification of glutinous rice in alcohol as will be described in more detail hereinafter.

"Mirin" to be used as a condiment is a product which is produced by mixing "shochu" (a clear, distilled liquor resembling gin) or ethyl alcohol, rice "koji," and steamed glutinous rice and leaving the mixture for a certain period in the presence of approximately 20 percent alcohol utilization being made of only the enzyme action due to the "koji," and no use, whatsoever, being made of the enzyme power of other microorganisms or yeasts, etc. While this wine has an extremely fragrant aroma and is, therefore, used extensively for the preparation of luxurious foods, its price is very high.

In the production of soy, the liquor obtained by compressing soy mash, that is, the so-called fresh soy, prior to pasteurization, contains a considerably large quantity of amylase and diastase, the power of which is of such an order as to be capable of amply saccharifying steamed glutinous rice of a weight which is 1.5 times the weight of the fresh soy.

Accordingly, it has been found by the present inventor that the utilization of fresh soy during the production of "mirin" mash is advantageous in effecting economy in the quantity of "koji" used. It has been found, furthermore, that the quantity of alcohol to be used need be merely of the order equal to the minimum required for preventing fermentation together with the preservative action of soy. At the most, a quantity of alcohol which is one half or less of that used in the ordinary "mirin" brewing process is sufficient for amply preventing bubbling due to fermentation. Moreover, no loss of the ingredients of "mirin" occurs, and the saccharification process can be carried forward safely.

Heretofore, such special seasoning sauces of rich, viscous character having sweet taste, delicious flavor, and saltiness as the daubing or steeping sauces used in broiling or barbecuing eels, fish, fowl, and other meats and in "sukiyaki" according, particularly, to the Japanese culinary art, have been prepared by mixing a large quantity of the aforesaid high-priced "mirin" with soy and further heating this mixture unitl it is mild and mellow. However, in this process of rendering the said mixture mild by this heat treatment, according to the known art, not only are complicated process procedure and time required, but the greater part of the alcohol, which is one of the important ingredients, is scattered and lost without being put to much effective use.

In view of the foregoing circumstances and facts, it is an essential object of the present invention to provide a process for the production of a new condimental liquid-sauce soy without entailment of the above-stated disadvantages.

It is another object of the invention to provide a process for the production of a new condimental liquid-sauce soy which can be produced at low cost, yet has excellent characteristics and possibility for use in a wide range of applications.

The foregoing objects, other objects, and advantages have been achieved by the process of this invention. While this process, for the most part, follows that for the production of "mirin," it uses particularly fresh soy, directly in its original state, as a starting material. A small quantity of alcohol is added to this fresh soy, and to this mixture, wherein the alcohol content is adjusted to be 19 percent or less, "koji" of nonglutinous rice is added or not added. Then steamed glutinous rice is mixed into the above said mixture, and mash preparation is carried out.

In the above-described manner, saccharification of the ingredients is caused to take place safely and thoroughly, with simultaneous utilization of the enzyme power of only the fresh soy and, in addition, the enzyme power of the "koji," within the soy which has ample preservative property, together with the action of the alcohol. As a result, a new condiment wherein the alcohol and ingredients of sweet taste and delicious flavor which are the principal ingredients of the "mirin" are caused to interfuse harmoniously and ripen to mellowness with the ingredients of sweet taste and salty taste possessed by the soy itself to form a consolidated, single substance is produced without the use of any special treatment whatsoever. The resulting condiment has a unique taste which makes it excellent for such applications as daubing or steeping soy sauce.

This soy sauce of the present invention has a further advantage in that, when it is used for culinary procedure requiring the use of "mirin" and soy, it not only harmonizes and blends extremely well with other sweet and salt seasonings added separately, because of the special characteristic of its unique taste, but it also contains a substantial quantity of alcohol which is ample for enhancing particularly the aroma also of the cooked substances. Accordingly, the new condimental, liquid-sauce soy of the invention exhibits excellent effectiveness in cooking procedure, yet it can be produced at low cost.

To facilitate a clearer understanding of the process of the invention, as well as the details thereof, a few examples of procedure are presented below.

EXAMPLE 1

280 grams of steamed glutinous rice obtained by steeping and steaming 208 grams of polished glutinous rice were mixed, with stirring, into a mixture liquid consisting of 34.4 cc. of 95 percent ethyl alcohol and 153.6 cc. of 22.29° Bé. fresh soy. Then the mixture was sealed tightly within its container and left at a room temperature of from 25 to 27° C., one cycle of stirring being carried out every 6 to 10 days. The mixture ripened in 30 days, and the composition of the compression-extracted liquid obtained therefrom was as follows:

| | |
|---|---|
| Yield _____ cc__ | 324 |
| Residue _____ grams__ | 55 |
| Baumé, ° _____ | 25.15 |
| Sodium chloride _____ percent__ | 7.30 |
| Total nitrogen _____ do____ | 0.81 |
| Amino-N _____ do____ | 0.35 |
| Total sugar _____ do____ | 39.45 |
| Glucose _____ do____ | 33.46 |
| Alcohol (ethyl) _____ do____ | 6.04 |

EXAMPLE 2

407 grams of steamed glutinous rice obtained by steeping and steaming and 23.3 grams of "koji" of polished, nonglutinous rice were blended with a mixture liquid consisting of 38.4 cc. of 95% alcohol and 153.6 cc. of 22.29° Bé. fresh soy for mash preparation. The mixture was then sealed and left at a room temperature of from 25 to 27° C., stirring being carried out every 6 to 10 days. The mixture ripened in 30 days, and the composition of the compression-extracted liquid obtained therefrom was as follows:

| | |
|---|---|
| Yield _____ cc__ | 344 |
| Residue _____ grams__ | 85 |
| Baumé, ° _____ | 26.12 |
| Sodium chloride _____ percent__ | 5.20 |
| Total nitrogen _____ do____ | 0.79 |
| Amino-N _____ do____ | 0.255 |
| Total sugar _____ do____ | 47.57 |
| Glucose _____ do____ | 44.76 |
| Alcohol (ethyl) _____ do____ | 4.45 |

EXAMPLES 3, 4, 5, 6 AND 7

The examples are similar to the Examples 1 and 2, and the compositions of the products resulting therefrom are indicated in the appended Table 1, wherein Examples 3 through 6 indicate production involving small quantities, while Example 7 indicates production with commercial quantities.

Table 1

| Example No. | 3 | 4 | 5 | 6 | 7 |
|---|---|---|---|---|---|
| Steamed glutinous rice (gram). | 340 | 350 | 288 | 188 | 1,750 kg. |
| "Koji" of nonglutinous rice (gram). | 23.0 | 29.4 | 83.0 | 54.0 | 129 kg. |
| 95% alcohol (cc.) | 38.0 | 48.0 | 49.0 | 64.0 | 200 litres. |
| Fresh soy (cc.) | 152.0 | 195.0 | 200.0 | 256.0 | 800 litres. |
| Yield (cc.) | 406 | 421 | 387 | 385 | 2,227 litres. |
| Residue (gram) | 68 | 95 | 155 | 100 | 342.4 kg. |
| Baumé (degree) | 25.66 | 25.44 | 25.78 | 23.25 | 25.98. |
| NaCl (percent) | 5.85 | 6.55 | 7.25 | 9.40 | 6.85. |
| Total nitrogen (percent) | 0.83 | 0.84 | 0.91 | 0.94 | 0.88. |
| Formalnitrogen (percent) | 0.273 | 0.357 | 0.358 | 0.486 | 0.315. |
| Total sugar (percent) | 44.76 | 41.14 | 40.28 | 28.36 | 42.52. |
| Glucose (percent) | 41.94 | 37.27 | 37.81 | 24.15 | 39.72. |
| Alcohol (percent) | 5.64 | 6.73 | 7.07 | 7.65 | 6.04. |

It is to be understood that the foregoing examples are presented as illustrative only, and that they are not intended to limit the scope of the invention, the contemplated scope of which is set forth in the appended claims.

What is claimed is:

1. A process for the production of a condimental, liquid-sauce soy, which comprises adding to fresh soy in its natural state substantially 19 percent ethyl alcohol, adding thereto koji of polished nonglutinous rice and steamed glutinous rice and mixing these ingredients thereby forming a mash; allowing the same to saccharify and ripen thus forming a mirin; compressing and filtering the mixture thus obtained and utilizing the filtrate.

2. A process for the production of a condimental, liquid-sauce soy, which comprises adding to fresh soy in its natural state substantially 19 percent alcohol, admixing thereto steamed glutinous rice, and thereby forming a mash; allowing the same to saccharify and ripen thus forming a mirin; compressing and filtering the mixture thus obtained and utilizing the filtrate.

References Cited in the file of this patent
UNITED STATES PATENTS

| 1,332,448 | Satow _____ Mar. 2, 1920 |
| 2,967,108 | Smith et al. _____ Jan. 3, 1961 |